(12) United States Patent
Sorensen

(10) Patent No.: US 7,386,377 B2
(45) Date of Patent: Jun. 10, 2008

(54) VEHICLE AND EQUIPMENT MONITORING APPARATUS

(76) Inventor: David I. Sorensen, 7636 W. Wagoner Rd., Glendale, AZ (US) 85308

( * ) Notice: Subject to any disclaimer, the term of this patent is extended or adjusted under 35 U.S.C. 154(b) by 258 days.

(21) Appl. No.: 11/100,978

(22) Filed: Apr. 7, 2005

(65) Prior Publication Data

US 2006/0229779 A1 Oct. 12, 2006

(51) Int. Cl.
G08B 9/04 (2006.01)
(52) U.S. Cl. .......................... 701/35; 340/439
(58) Field of Classification Search ................ 701/35, 701/33, 34, 36; 340/439, 500, 426.22, 426.17, 340/426.23, 426.24; 342/61, 357.06, 357.07, 342/357.09
See application file for complete search history.

(56) References Cited

U.S. PATENT DOCUMENTS

| | | | | |
|---|---|---|---|---|
| 5,719,771 A | * | 2/1998 | Buck et al. ............... | 455/456.5 |
| 5,917,434 A | * | 6/1999 | Murphy .................... | 340/991 |
| 6,014,602 A | * | 1/2000 | Kithil et al. ............... | 701/45 |
| 6,079,340 A | * | 6/2000 | Flamme et al. ............. | 111/178 |
| 6,167,333 A | * | 12/2000 | Gehlot ..................... | 701/35 |
| 6,240,773 B1 | * | 6/2001 | Rita et al. ................. | 73/118.1 |
| 6,496,766 B1 | * | 12/2002 | Bernold et al. ............ | 701/50 |
| 6,556,905 B1 | | 4/2003 | Mittelsteadt et al. | |
| 6,714,857 B2 | | 3/2004 | Kapolka et al. | |
| 7,113,105 B2 | * | 9/2006 | Sahm et al. ............... | 340/679 |
| 7,164,117 B2 | * | 1/2007 | Breed et al. ............... | 250/221 |
| 2002/0032517 A1 | | 3/2002 | Buckelew et al. | |
| 2002/0089434 A1 | | 7/2002 | Ghazarian | |
| 2002/0116156 A1 | | 8/2002 | Remboski et al. | |
| 2002/0183975 A1 | | 12/2002 | Wiens | |
| 2004/0138790 A1 | | 7/2004 | Kapolka et al. | |
| 2004/0181495 A1 | | 9/2004 | Grush | |

* cited by examiner

Primary Examiner—Dalena Tran

(57) ABSTRACT

A vehicle has a safe and a utility device operable for performing a task having a result capable of being measured. A local processor is associated with local storage, each of which is housed in a safe preventing access thereto. An operator input console associated with the local storage is carried by the vehicle and is disposed outside the safe. A positioning system associated with the local processor generates position information of the vehicle during operation of the utility device. A sensor associated with the utility device and the local processor generates result information of the result of the operation of the utility device. The local processor stores in the local storage the position information, the result information, and the operator input information. The operator input console and the local processor are adapted and arranged preventing access to the local storage in response to operation of the operator input console.

19 Claims, 9 Drawing Sheets

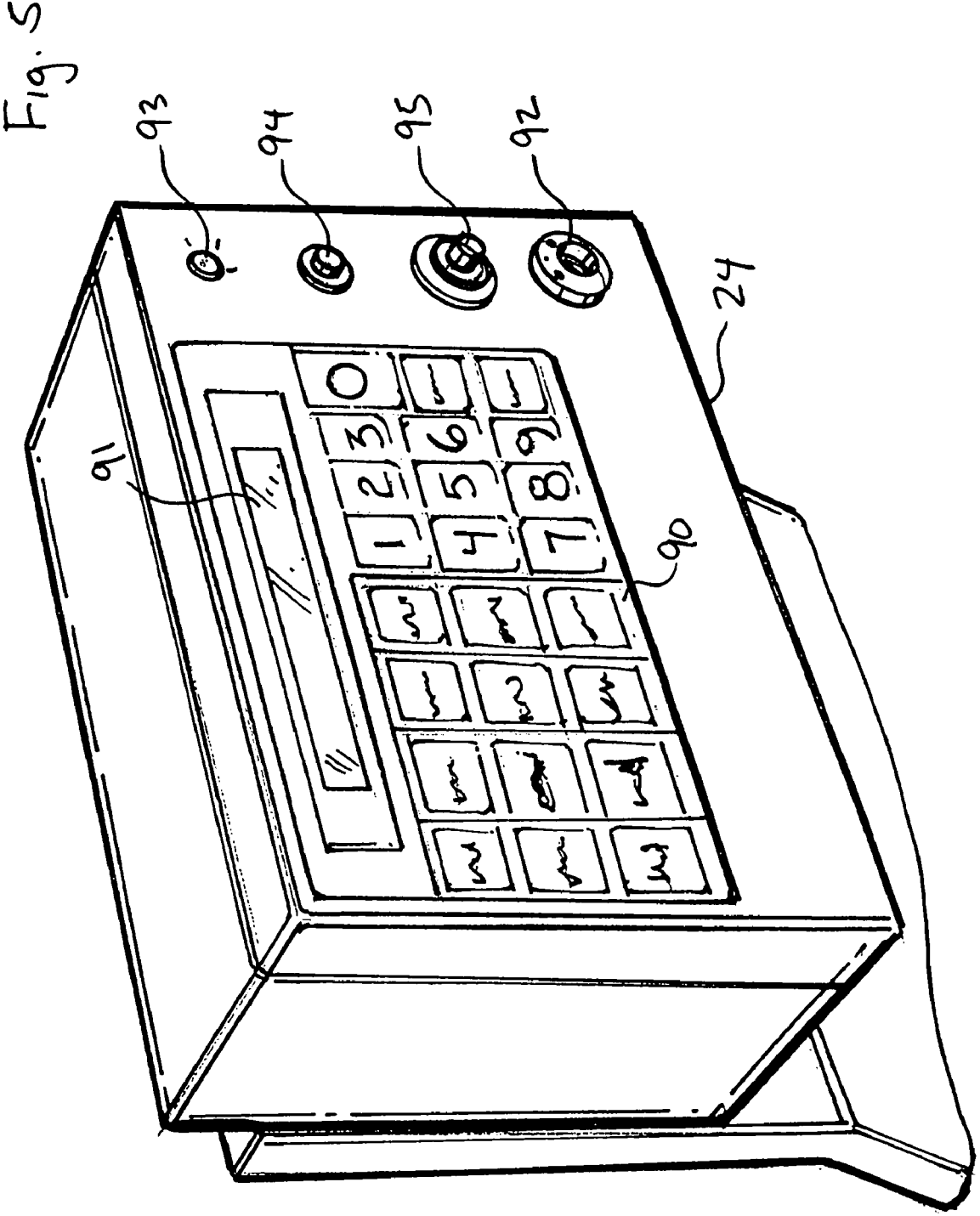

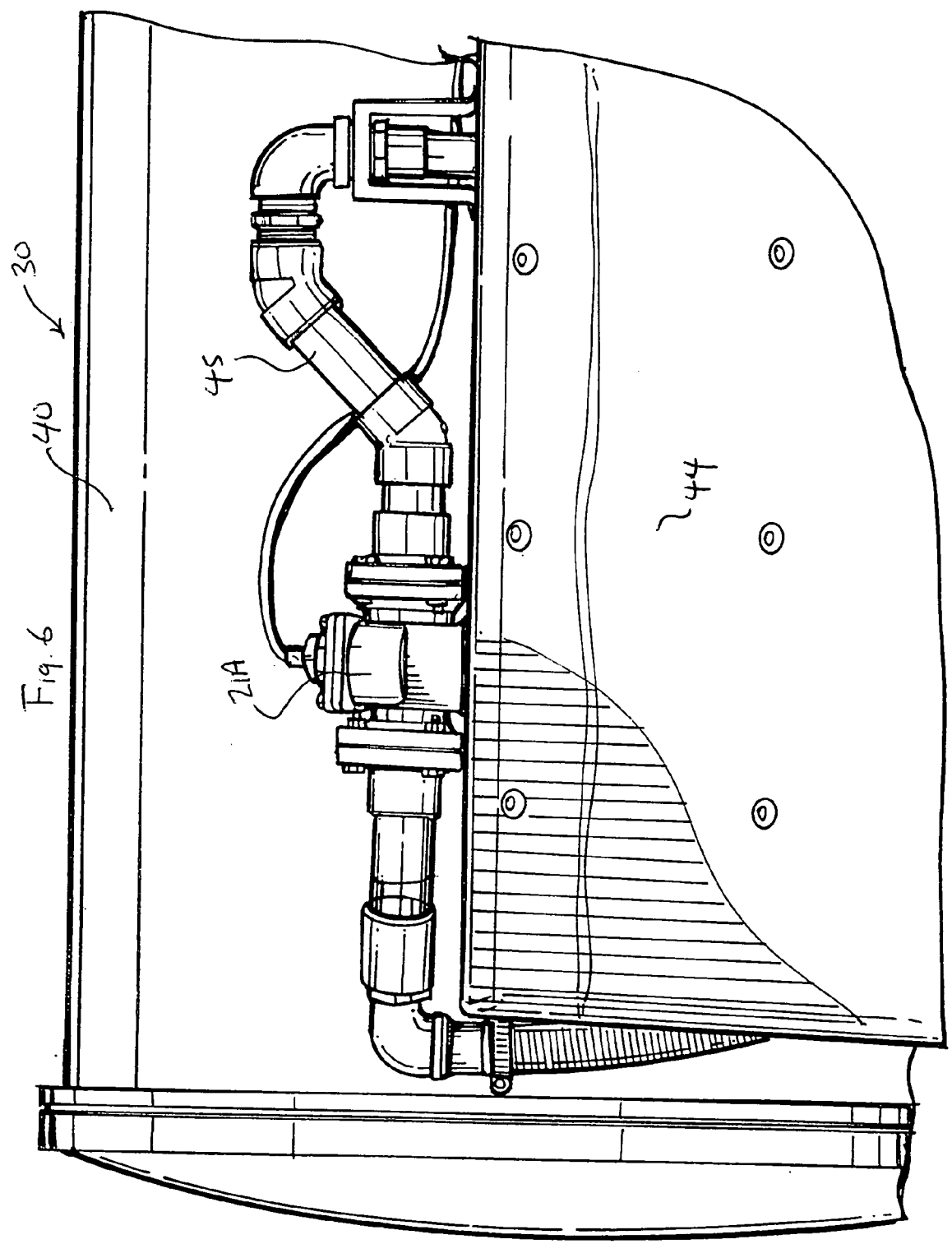

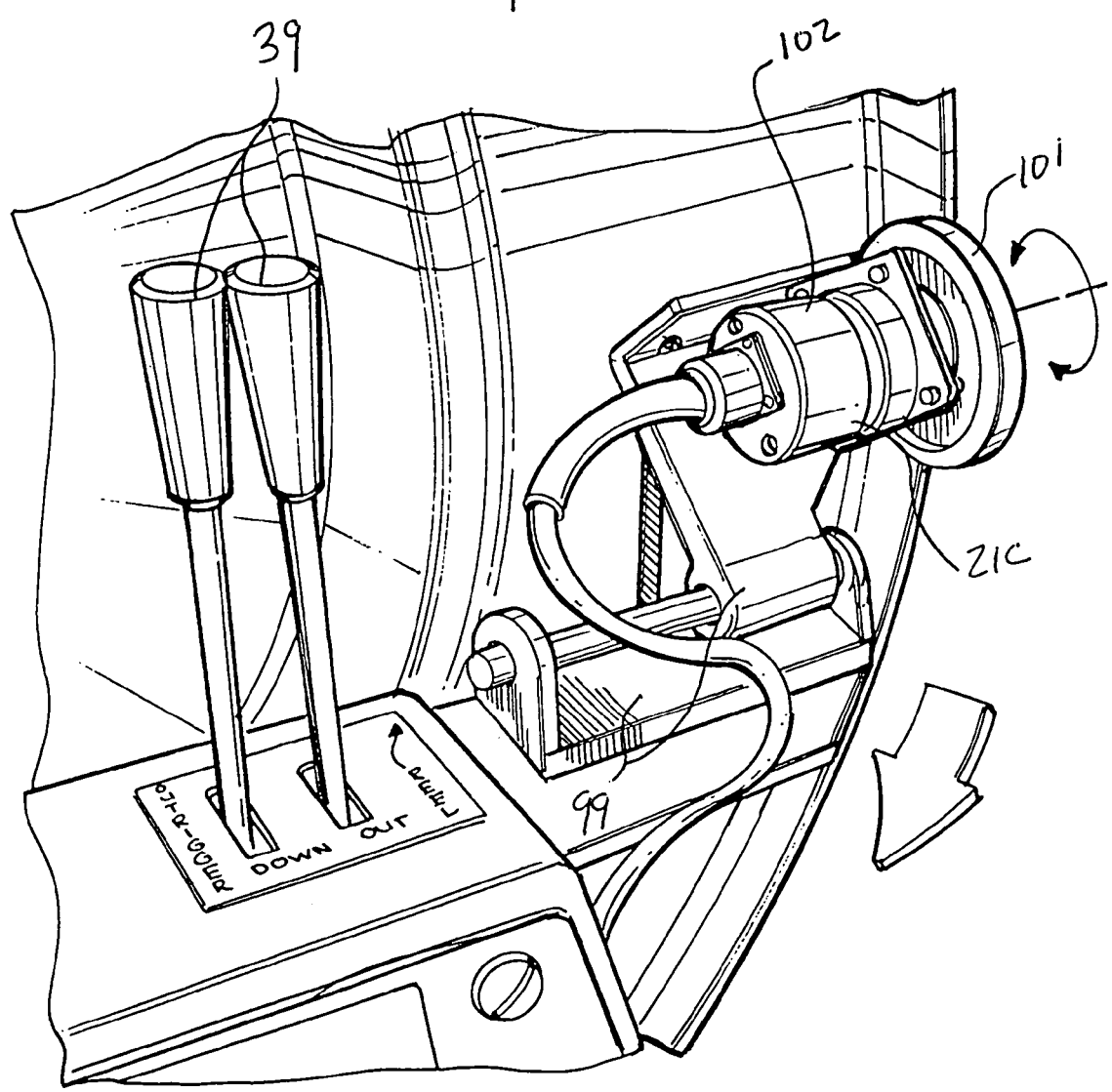

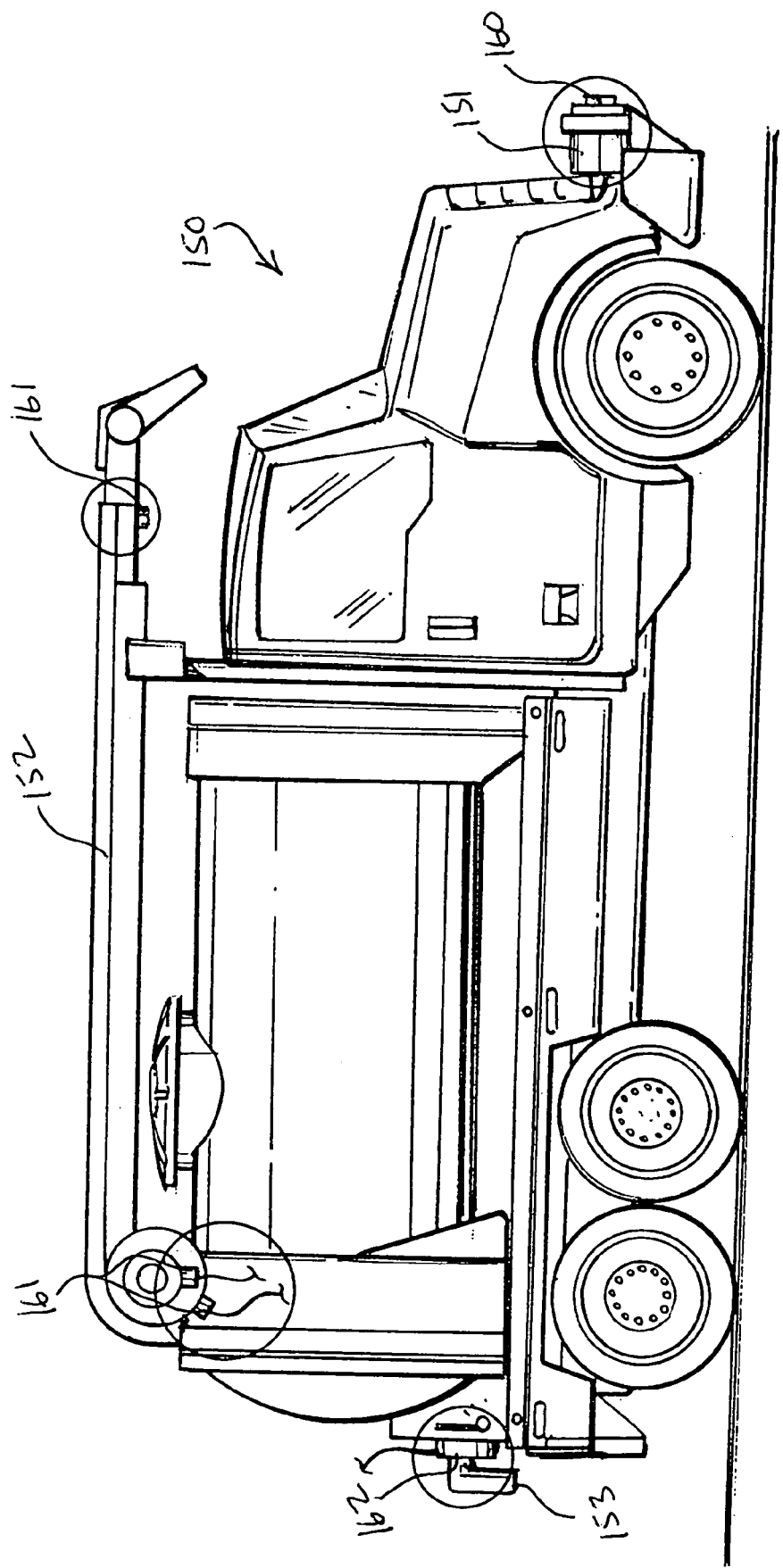

Fig. 9

| Summary Of Totals | Gallons of Water Filled | Hose Away | Grit | Roots | Sticks | Rags | Inflt. | Grease | Sand | Trunk Line | Rocks | Bricks |
|---|---|---|---|---|---|---|---|---|---|---|---|---|
| Number of Notes Written | 1893 | 753 | 0 | 1 | 0 | 0 | 0 | 2 | 0 | 0 | 1 | 0 |
| | | Stub Out | Cut Roots | Root X | Tap Cut | Lift Station | "+" | Sand Trap | Hot Spot | Drop | Canyon | Grease Nozzle |
| 1 | | 0 | 0 | 0 | 0 | 0 | 0 | 0 | 0 | 0 | 0 | 0 |

(Sensor Readings)            (Operator Inputs)

| Latitude North Nxx.xxxxx | Longitude West Wxxx_xx.xxxxx | Passenger Seat Occupied | Water Pressure | Vacuum | Smoke Detector | Breath Detector | Gallons Water Out | Hose Out (Away) | Hose In (Return) | Manholes Cleaned | Objects Found | Operation Date and Time |
|---|---|---|---|---|---|---|---|---|---|---|---|---|
| 33387853 | 112136880 | | | | | | 257 | | | | | 1/4/05 10:41 AM |
| 33387868 | 112136246 | | Pressure | | | | 463 | | | 121401700 | | 1/4/05 10:42 AM |
| 33387849 | 112136078 | | Pressure | | | | 809 | 35 | | 221400400 | | 1/4/05 10:43 AM |
| 33387851 | 112135581 | | Pressure | | | | 1179 | 170 | | | | 1/4/05 10:43 AM |
| 33387851 | 112135442 | | Pressure | | | | 1179 | 282 | | | | 1/4/05 10:44 AM |
| 33387853 | 112134893 | | Pressure | | | | 1179 | 326 | 17 | | | 1/4/05 10:45 AM |
| 33387852 | 112134864 | | Pressure | Vacuum | | | 1179 | 326 | 119 | | | 1/4/05 10:46 AM |
| 33387851 | 112134300 | | Pressure | Vacuum | | | 1179 | 326 | 202 | | | 1/4/05 10:47 AM |
| 33387843 | 112134228 | | Pressure | Vacuum | | | 1179 | 326 | 297 | | | 1/4/05 10:48 AM |
| 33387849 | 112133729 | | Pressure | Vacuum | | | 1179 | 326 | 326 | | | 1/4/05 10:49 AM |
| 33387846 | 112133596 | | Pressure | | | | 1179 | 326 | 326 | | | 1/4/05 10:50 AM |
| 33387848 | 112133118 | Occupied | | | Smoke | | 1179 | 326 | 326 | | Grease | 1/4/05 10:50 AM |
| 33387856 | 112132969 | Occupied | | | Smoke | | 1363 | 326 | 326 | | Roots | 1/4/05 10:51 AM |
| 33388417 | 112133152 | | | | Smoke | | 1620 | 326 | 326 | 121400400 | | 1/4/05 10:52 AM |
| 33388414 | 112133309 | | Pressure | | Smoke | | 1861 | 326 | 326 | 221400300 | | 1/4/05 10:53 AM |
| 33388426 | 112135086 | | Pressure | | | | 1893 | 403 | 326 | 321400200 | | 1/4/05 10:55 AM |
| 33388443 | 112136673 | | Pressure | | | | 1893 | 511 | 326 | | | 1/4/05 10:57 AM |
| 33388509 | 112136666 | | Pressure | | | | 1893 | 673 | 326 | | | 1/4/05 10:58 AM |
| 33388932 | 112136575 | | Pressure | | | | 1893 | 702 | 326 | | | 1/4/05 11:00 AM |
| 33388918 | 112135851 | | Pressure | | | | 1893 | 753 | 425 | | | 1/4/05 11:01 AM |
| 33388938 | 112135531 | | Pressure | | | | 1893 | 753 | 550 | | | 1/4/05 11:02 AM |
| 33388929 | 112135090 | | Pressure | Vacuum | | | 1893 | 753 | 637 | | | 1/4/05 11:03 AM |
| 33388937 | 112134258 | | Pressure | Vacuum | | | 1893 | 753 | 701 | | Grease | 1/4/05 11:05 AM |
| 33388954 | 112133243 | | Pressure | Vacuum | | | 1893 | 753 | 720 | | Rocks | 1/4/05 11:07 AM |
| 33388940 | 112133037 | | Pressure | Vacuum | | | 1893 | 753 | 753 | | See Note | 1/4/05 11:08 AM |
| 33389540 | 112133257 | Occupied | | | | Alcohol | 1893 | 753 | 753 | | | 1/4/05 11:09 AM |
| 33389544 | 112133494 | Occupied | | | Smoke | Alcohol | 1893 | 753 | 753 | | | 1/4/05 11:11 AM |
| 33401686 | 112120719 | Occupied | | | Smoke | Alcohol | 1893 | 753 | 753 | | | 1/4/05 11:25 AM |
| 33401697 | 112120719 | | | | | | 1893 | 753 | 753 | | | 1/4/05 11:26 AM |

VEHICLE AND EQUIPMENT MONITORING APPARATUS

BACKGROUND OF THE INVENTION

1. Field of the Invention

The present invention relates to apparatus and methods for monitoring vehicles and equipment.

2. Related Art and Prior Art Statement

The widespread existence of companies that utilize fleets of motor vehicles for carrying out work related activities is commonplace in the modern world. Local ordinances and laws, company procedures and policies, and liability concerns necessitate that the owners of work related motor vehicles keep careful track of their vehicles during use, and document the use of any utility equipment incorporated therewith used to perform certain tasks, such equipment used to clean sewer/collection lines including vacuums and hoses, equipment used to lift objects such as cranes and lifts, equipment used to transport and dispense material such as concrete drums and dump receptacles, equipment used to transport and dispense cable or wiring such as spools, etc. Although existing vehicle tracking systems are able to adequately monitor and track vehicle location and also the location of utility equipment incorporated therewith, existing systems suffer in that they are inherently unreliable, fail to provide a way to adequately collect information and safeguard it from unauthorized access and tampering, and fail to provide a way to collect information that is able to reliably show that the equipment managed and maintained by a vehicle was actually put to use. Given these and other deficiencies in the art, the need for certain new and useful improvements is evident.

SUMMARY OF THE INVENTION

According to the invention there is provided apparatus, including a vehicle having a safe and a utility device operable for performing a task having a result capable of being measured. A local processor is associated with local storage, each of which is housed in the safe. The safe prevents access to the local processor and the local storage housed therein. A positioning system associated with the local processor is also provided, which generates position information of the vehicle during operation of the utility device. A sensor associated with the utility device and the local processor is also provided, which generates result information of the result of the operation of the utility device. The local processor stores in the local storage the position information, and the result information. Also provided is an operator input console is carried by the vehicle for accepting operator input information about the operation of the utility device. The operator input console is associated with the local processor and is disposed outside of the safe so as to be accessible by an operator of the vehicle. The local processor stores in the local storage the operator input information. The operator input console and the local processor are adapted and arranged preventing access to the local storage in response to operation of the operator input console. The vehicle supports a cab. A smoke detector associated with the local processor is also provided, which generates smoke detection information from within the cab of the vehicle. The local processor stores in the local storage the smoke detection information. A breath detector associated with the local processor is also provided, which generates breath detection information from within the cab of the vehicle. The local processor stores in the local storage the breath detection information. The breath detector is associated with an in-cab hand-held transmitter of a communications radio onboard the vehicle. The cab is furnished with a passenger seat. A seat occupancy sensor is associated with the passenger seat, which generates passenger seat occupancy information of the passenger seat. The local processor stores in the local storage the passenger seat occupancy information. A central processor associated with central storage are also provided, each of which is housed at a central location remote from the vehicle. A wireless data transfer link is provided between the local processor and the central processor. The local processor accesses the storage and transmits the position information, the result information, the operator input information, the smoke detection information, the breath detection information, and the passenger seat occupancy information to the central processor via the wireless data transfer link. The central processor receives and stores into the central storage the position information, the result information, the operator input information, the smoke detection information, the breath detection information, and the passenger seat occupancy information. Preferably, the positioning system is a global positioning system. At least one engine is carried by the vehicle providing it with mobility, in which the utility device is neither such an engine nor any part of such an engine. The wireless data transfer link is provided by a local data transfer radio associated with a local data transfer antenna each carried by the vehicle, and a corresponding central data transfer radio associated with a central data transfer antenna each housed at the central location. Preferably, the local data transfer radio is housed in the safe.

According to another embodiment of the invention there is provided apparatus, including a vehicle having a safe and a utility device operable for performing a task having a result capable of being measured. A local processor is associated with local storage, each of which is housed in the safe. The safe prevents access to the local processor and the local storage housed therein. An operator input console is carried by the vehicle for accepting operator input information about the operation of the utility device. The operator input console is associated with the local processor and is disposed outside of the safe so as to be accessible by an operator of the vehicle. A positioning system associated with the local processor is also provided, which generates position information of the vehicle during operation of the utility device. A sensor associated with the utility device and the local processor is also provided, which generates result information of the result of the operation of the utility device. The local processor stores in the local storage the position information, the result information, and the operator input information. The operator input console and the local processor are adapted and arranged preventing access to the local storage in response to operation of the operator input console. The vehicle supports a cab. A smoke detector associated with the local processor is also provided, which generates smoke detection information from within the cab of the vehicle. The local processor stores in the local storage the smoke detection information. A breath detector associated with the local processor is also provided, which generates breath detection information from within the cab of the vehicle. The local processor stores in the local storage the breath detection information. The breath detector is associated with an in-cab hand-held transmitter of a communications radio onboard the vehicle. The cab is furnished with a passenger seat. A seat occupancy sensor is associated with the passenger seat, which generates passenger seat occupancy information of the passenger seat. The local processor stores in the local storage the passenger seat occupancy information. A central processor associated with central storage are also provided, each of which is housed at a central location remote from the vehicle. A wireless data transfer link is provided between the local processor and the central processor. The local processor accesses the storage and transmits the position information, the result information, the operator input information, the smoke detection information, the breath detection information, and the passenger seat occupancy information to the central processor via the wireless data transfer link. The central processor receives and stores into the central storage the position information, the result information, the operator input information, the smoke detection information, the breath detection information, and the passenger seat occupancy information. Preferably, the positioning system is a global positioning system. At least one engine is carried by the vehicle providing it with mobility, in which the utility device is neither such an engine nor any part of such an engine. The wireless data transfer link is provided by a local data transfer radio associated with a local data transfer antenna each carried by the vehicle, and a corresponding central data transfer radio associated with a central data transfer antenna each housed at the central location. Preferably, the local data transfer radio is housed in the safe.

According to yet another embodiment of the invention there is provided apparatus, including a vehicle having a safe and a utility device operable for performing a task having a result capable of being measured. A local processor is associated with local storage, each of which is housed in the safe preventing access to the local processor and the local storage housed therein. An operator input console is carried by the vehicle for accepting operator input information about the operation of the utility device. The operator input console is associated with the local processor and is disposed outside of the safe so as to be accessible by an operator of the vehicle. A positioning system is associated with the local processor, which generates position information of the vehicle during operation of the utility device. A sensor is associated with the utility device and the local processor, which generates result information of the result of the operation of the utility device. The local processor stores in the local storage the position information, the result information, and the operator input information. The operator input console and the local processor are adapted and arranged preventing access to the local storage in response to operation of the operator input console. Further to this embodiment is a central processor associated with central storage, each of which is housed at a central location remote from the vehicle. A wireless data transfer link is provided between the local processor and the central processor. The local processor accesses the storage and transmits the position information, the result information, and the operator input information to the central processor via the wireless data transfer link. The central processor receives and stores into the central storage the position information, the result information, and the operator input information. Still further to this embodiment is a cab supported by the vehicle and a smoke detector associated with the local processor, which generates smoke detection information from within the cab of the vehicle. The local processor stores in the local storage the smoke detection information, accesses the storage and transmits the smoke detection information to the central processor via the wireless data transfer link, in which the central processor receives and stores into the central storage the smoke detection information. Further to this embodiment is a breath detector associated with the local processor, which generates breath detection information from within the cab of the vehicle. The local processor stores in the local storage the breath detection information, accesses the storage and transmits the breath detection information to the central processor via the wireless data transfer link, in which the central processor receives and stores into the central storage the breath detection information. Preferably, the breath detector is associated with an in-cab hand-held transmitter of a communications radio onboard the vehicle. The cab is also furnished with a passenger seat. A seat occupancy sensor is associated with the passenger seat, which generates passenger seat occupancy information of the passenger seat. The local processor stores in the local storage the passenger seat occupancy information, accesses the storage and transmits the passenger seat occupancy information to the central processor via the wireless data transfer link. The central processor receives and stores into the central storage the passenger seat occupancy information. Preferably, the positioning system is a global positioning system. At least one engine is carried by the vehicle for providing the vehicle with mobility, in which the utility device is neither such an engine nor any part of such an engine. The wireless data transfer link is provided by a local data transfer radio associated with a local data transfer antenna each carried by the vehicle, and a corresponding central data transfer radio associated with a central data transfer antenna each housed at the central location. The local data transfer radio is housed in the safe.

In a vehicle including a cab, an engine for providing the vehicle with mobility, a utility device apart from the engine operable for performing a task having a result capable of being measured, a local processor associated with local storage each carried by the vehicle, an operator input console carried by the vehicle for accepting operator input information about the operation of the utility device and associated with the local processor, a positioning system associated with the local processor for generating position information of the vehicle during operation of the utility device, a sensor associated with the utility device and the local processor for generating result information of the result of the operation of the utility device, the local processor for storing in the local storage the position information and the result information and the operator input information, a central processor associated with central storage each housed at a central location remote from the vehicle, a wireless data transfer link between the local processor and the central processor, the local processor for accessing the storage and transmitting the position information and the result information and the operator input information to the central processor via the wireless data transfer link, and the central processor for receiving and storing into the central storage the position information and the result information and the operator input information, improvements therein in accordance with a further embodiment of the invention include 1) the operator input console and the local processor adapted and arranged preventing access to the local storage in response to operation of the operator input console, 2) the local processor and the local storage each housed in a safe mounted to the vehicle, the safe preventing access to the local processor and the local storage housed therein, and 3) the operator input console disposed outside of the safe so as to be accessible by an operator of the vehicle. The improvements further include a smoke detector associated with the local processor, which generates smoke detection information from within the cab of the vehicle. The local processor stores in the local storage the smoke detection information, and also accesses the storage and transmits the smoke detection information to the central processor via the wireless data transfer link, in which the central processor receives and stores into the central storage the smoke detection information. The improvements still further include a breath detector associated with the local processor, which generates breath detection information from within the cab of the vehicle. The local processor stores in the local storage the breath detection information, and also accesses the storage and transmits the breath detection information to the central processor via the wireless data transfer link, in which the central processor receives and stores into the central storage the breath detection information. The improvements further specify that the breath detector is associated with an in-cab hand-held transmitter of a communications radio onboard the vehicle. The improvements still further specify a passenger seat in the cab, and a seat occupancy sensor associated with the passenger seat, which generates passenger seat occupancy information of the passenger seat. The local processor stores in the local storage the passenger seat occupancy information, and also accesses the storage and transmits the passenger seat occupancy information to the central processor via the wireless data transfer link, in which the central processor receives and stores into the central storage the passenger seat occupancy information.

Consistent with the foregoing summary of preferred embodiments, and the ensuing detailed description, which are to be taken together, the invention also contemplates associated apparatus/system and method embodiments.

BRIEF DESCRIPTION OF THE DRAWINGS

Referring to the drawings:

FIG. 5 is an enlarged perspective view of the operator input console first set forth in FIG. 3;

FIG. 6 is an enlarged fragmented side elevational view of the vehicle of FIG. 2 illustrating a sensor of the apparatus of FIG. 1 associated with a fluid conduit;

FIG. 7 is an enlarged fragmented perspective view of the vehicle of FIG. 2 illustrating a sensor associated with a spool;

FIG. 8 is a side elevational view of another embodiment of a vehicle incorporating the apparatus of FIG. 1; and FIG. 9 illustrates a report generated by the apparatus of FIG. 1.

DETAILED DESCRIPTION OF PREFERRED EMBODIMENTS

Figure 1:
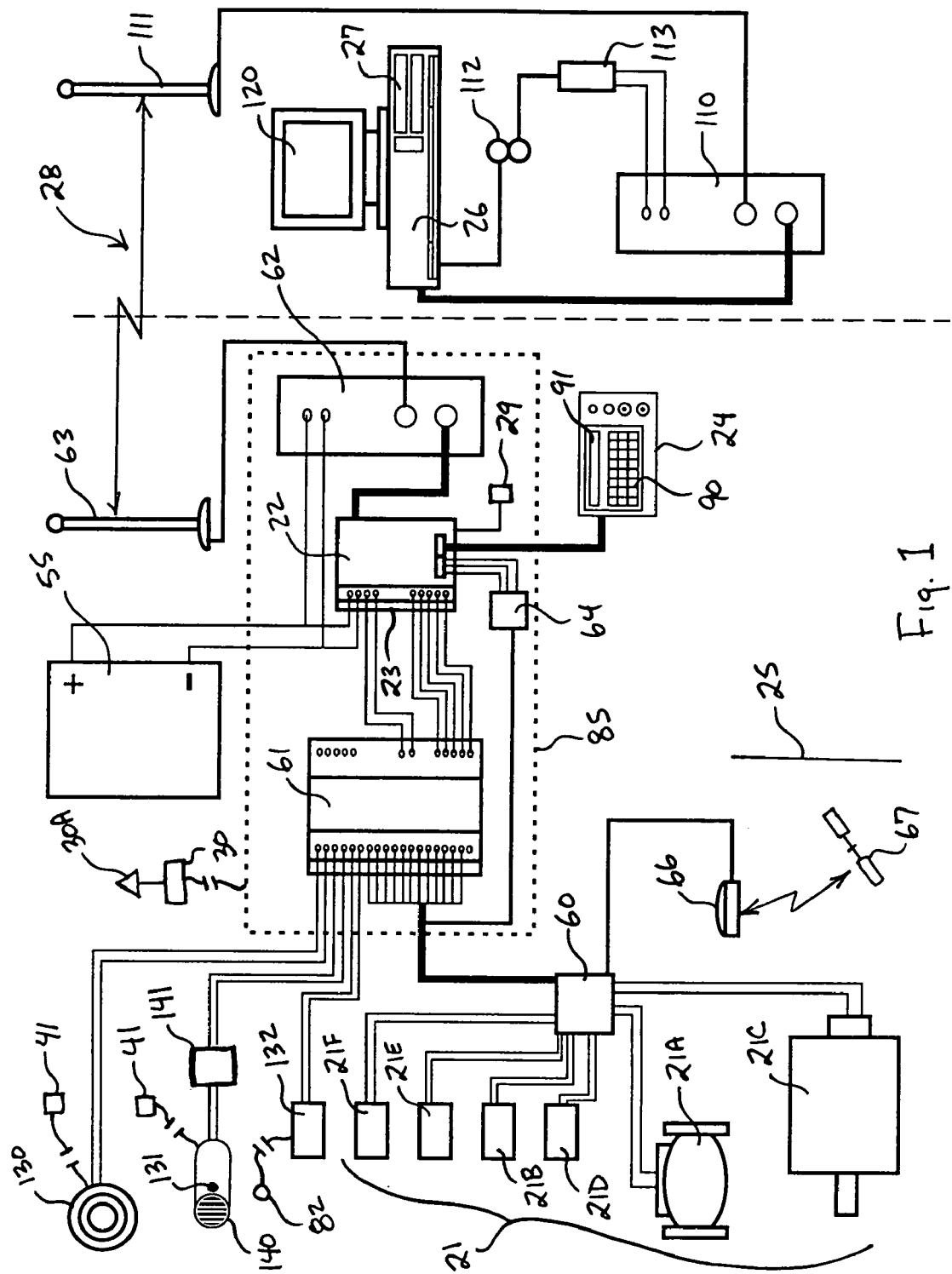
FIG. 1 is a schematic representation of a vehicle and equipment monitoring apparatus constructed and arranged in accordance with the principle of the invention.

Turning now to the drawings, in which like reference characters indicate corresponding elements throughout the several views, attention is first directed to FIG. 1 in which there is seen a schematic representation of a vehicle and equipment monitoring apparatus/apparatus 20 constructed and arranged in accordance with a preferred embodiment of the invention. Apparatus 20 includes "local" components, which are to be maintained by a vehicle, and "central" components, which are to be housed and maintained at a central location remote from the vehicle of apparatus 20. The local components of apparatus 20 include sensors 21, a local client characterized by a local processor 22 associated with local storage or memory 23, an operator input console 24, a positioning system 25, and a clock 29 for keeping the date and time, all of which are to be incorporated with a vehicle, such as vehicle 30 set forth in FIG. 2. The central components of apparatus 20 include a central processor 27 associated with central storage or memory 27, which together characterize a central client of apparatus 20.

A wireless data transfer link 28 is provided between the local client and the central client and, more particularly, between local processor 22 and central processor 26, which is used to transfer data between local processor 22 and central processor 26. In this particular embodiment, link 28 is facilitated by local data transfer components at vehicle 30, and central data transfer components at the central location. The local data transfer components include a local data transfer radio 62 coupled to a local data transfer antenna 63, and the central data transfer components include a central data transfer radio 110 coupled to a central data transfer antenna 111.

Figure 2:
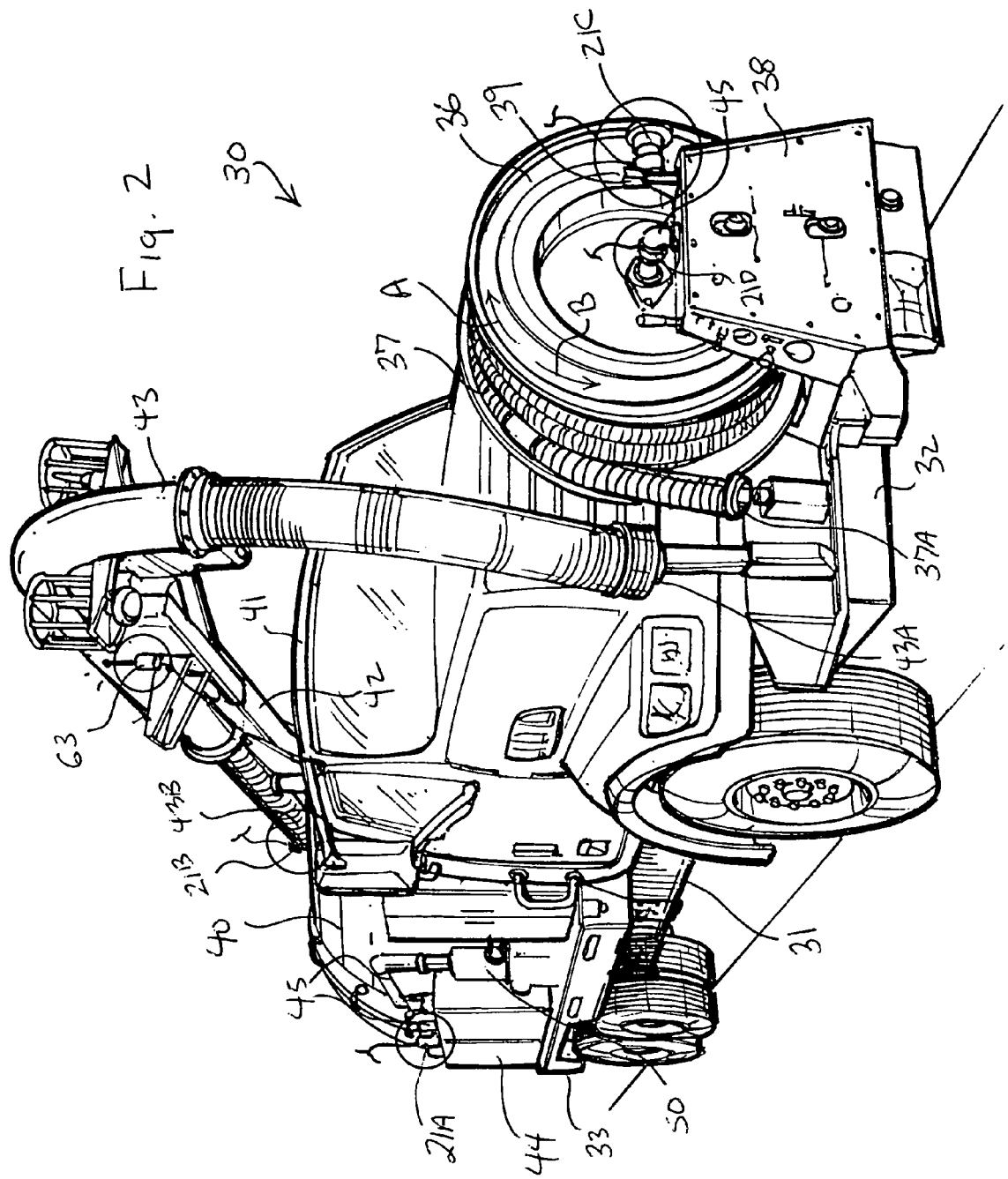
FIG. 2 is a perspective view of a vehicle incorporating the apparatus of FIG. 1.

Referring to FIG. 2, vehicle 30 is set forth as a matter of example of a type of vehicle that can be used in apparatus 20. Vehicle 30 is generally representative of a "combination machine," which is a type of vehicle having a primary use as an instrument for cleaning sewer/collection lines. With the exception of the portions of apparatus 20 incorporated therewith, vehicle 30 is conventional and well known, the structure and operation of which will be discussed only briefly and, moreover, only to the extent necessary in order to make a full and complete disclosure of the invention.

With continuing reference to FIG. 2, vehicle 30 includes a chassis 31 having a forward or upstream end 32 and a rearward or downstream end 33, a curb or starboard side and an opposing street or port side. A spool 36 is mounted for rotation to chassis 31 at forward end 32. A hose 37, having a distal or working end 37A and an opposing proximal end (not shown), is wound about spool 36, hose 37 winding relative to spool 36 upon rotation thereof in a first direction indicated by arcuate arrowed line A, and unwinding relative to spool 36 upon rotation thereof in a second direction indicated by arcuate arrowed line B. A motor 38 at forward end 32 of chassis 31 is employed in this embodiment for driving spool 36 for rotation for unwinding and winding hose 37, the operation of which is managed, for instance, by controls 39 associated with motor 38. Spool 36 may be configured to be manually rotated, if desired.

Chassis 31 carries a large storage tank 40 at rearward end 33, and a cab 41 positioned between forward end 32 and storage tank 40. A boom 42 is mounted to chassis 31 and supports a large diameter vacuum hose 43 having a distal or working end 43A and an opposing proximal end 43B coupled to storage tank 40 in fluid communication. Vehicle 30 is furnished with boom controls (not shown), which are used to operate and maneuver and translate boom 42, namely, to pivot boom 42 from side-to-side, move boom 42 between a lowered/resting position as shown in FIG. 2, and a raised position, and to also move boom 42 between retracted and extended conditions, in which this operation of boom is used to manage and control the position of vacuum hose 43, and also it's length, in which it is to be understood that vacuum hose 43 extends and retracts concurrently with boom 42 as it is extended and retracted. A vacuum pump (not shown) can be activated, either with the boom controls or other controls, drawing a vacuum through vacuum hose 43 for drawing fluid and debris therethrough from working end 43A into storage tank 40 through proximal end 43B.

Mounted to chassis 31 alongside storage tank 40 at rearward end 33 is a cleansing fluid storage tank 44, which is coupled in fluid communication with the proximal end (not shown) of hose 37 via a conduit 45 incorporated into vehicle 30. The entire length of conduit 45 is not shown in FIG. 2 because much of it is enclosed or hidden from view. As a matter of reference, a portion of conduit 45 is located at forward end 32 of vehicle 30, which extends into a central portion of spool 36 and is coupled in fluid communication with the proximal end (not shown) of hose 37. Although only one cleansing fluid storage tank 44 is shown, more can be used in conjunction with vehicle 30, if desired.

As previously mentioned, vehicle 30 is exemplary of a conventional combination machine, and is set forth as a matter of illustration to show a particular embodiment of the invention and a particular implementation of apparatus 20 in conjunction with a particular type of vehicle. And so vehicle 30 is put to use for cleaning collection lines and is manned by a human operator/user in accordance with conventional practice. To clean a collection line, vehicle is 30 is driven to a designated manhole, parked, and the manhole cover is removed in a conventional manner. Hose 37 is put to use by first unwinding it from spool 36, in which the unwinding of hose 37 is made either manually or, more practically, by operating controls 39 to rotate spool 36 for unwinding hose 37 relative to spool 36. Working end 37A of hose 37 is directed into the collection line through the manhole, and a pump 50 associated with conduit 45 is activated, such as by controls 39 or other controls. In response to activating pump 50, it forcibly draws cleansing fluid from tank 44 to hose 37 and which is forcibly ejected outwardly through working end 37A in the form of a stream. The cleansing fluid maintained by tank 44 can be water, water combined with one or more cleansing agents, or other suitable cleansing fluid. Working end 37A is managed by the operator manning hose 37 to direct the stream of cleansing fluid ejected from working end 37A into the collection line in a desired manner for effecting a cleaning of the collection line. After this cleaning operation is completed, pump 50 is deactivated and spool 36 is rotated winding hose 37 relative to spool 36 so as to place hose 37 in its wound or stored position on spool 36.

Vacuum hose 43 is normally used in conjunction with hose 37. To employ vacuum hose 43, boom 42 is activated and moved maneuvering vacuum hose 43 and positioning its working end 43A through the manhole and into the collection line under cleaning. The vacuum pump (not shown) carried by vehicle 30 is activated forming a vacuum through vacuum hose from working end 43A to end 43B and into storage tank 40, in which fluid and debris from within the collection line are vacuumed into and through vacuum hose 43 from working end 43A to end 43B and collected in storage tank 40, and this is usually, but not always, done concurrently with the operation of hose 37. After the desired vacuuming is completed, vacuum pump 43 is deactivated and boom 42 is moved back to its lowered/resting position for placing vacuum hose 43 back into its starting or stored position relative to vehicle 30. It is to be understood that this vacuum operation can be carried out concurrently with the use of hose 37, after the use of hose 37, and also independently of the use of hose 37. The manhole cover is replaced after the collection line is cleaned.

Set forth for the purpose of illustration and reference, vehicle 30 is exemplary of a conventional combination machine. Further details thereof not herein specifically addressed will readily occur to the skilled artisan and will not be discussed. It is to be understood that hose 37 and vacuum hose 43 are "utility devices" of vehicle 30 which are each used to perform a particular task, and that the normal operation of vehicle 30 includes the operation of these utility devices. It is to be understood that, as represented in FIG. 1, apparatus 20 is incorporated with vehicle 30, which has at least one engine 30A for providing vehicle 30 with motorized mobility. According to this disclosure, the term "utility device" does not include engine 30A for providing vehicle 30 with motorized mobility, nor does the term "utility device" include or otherwise encompass any feature, part, features, or parts of engine 30A. In other words, the term "utility device" is neither such an engine of vehicle 30 nor any part of such an engine of vehicle 30. The term "utility device" is carefully limited to a piece of equipment on vehicle 30 which is to be used for carrying out a particular task(s) not related to the engine or to any of its parts, in which the particular task(s) has one or more results that are capable of being measured, and in which the task(s) can, according to the utility equipment on vehicle 30, include providing a cleansing fluid to a collection line, vacuuming fluid/material from a collection line, etc. Vehicle 30 acts as the carrier for the utility devices herein described.

Referring back to FIG. 1, sensors 21, local processor 22, local storage 23, operator input console 24, positioning system 25, and clock 29 are carried by and incorporated with vehicle 30, and are coupled together with conventional and well known electrical and data transfer cabling/interconnections. Local processor 22 and storage 23 are exemplary of a conventional computer. An embedded operating platform/system, which is maintained by storage 23 or other associated storage/memory, governs the management and operation of local processor 22. Storage 23 is conventional in nature, consisting of a hard drive storage/memory, flash storage/memory, or other suitable or selected storage/memory form.

A local power source 55 is coupled to local processor 22, which empowers the components of apparatus 20 onboard vehicle 30 with electrical power. In accordance with a preferred embodiment, power source 55 is a battery onboard vehicle 30, such as the engine battery, or other suitable battery, or combination of batteries. Power source 55 can be any suitable power source capable of empowering the components of apparatus 20 onboard vehicle 30 with electrical power, including, for instance, a generator, a solar power cell structure, etc.

Sensors 21 are coupled to an electrical junction box 60 disposed at a predetermined and suitable location on vehicle 30, which is in turn coupled to an input/output switch 61 and which is in turn coupled to local processor 22. Local processor 22 is associated with local storage 23, and is operative for storing information therein generated by sensors 21. Information generated by sensors 21 is channeled to local processor 22 for storage in local storage 23 via junction box 60 and input/output switch 61. Operator input console 24 is coupled to local processor 22, as is data transfer radio 62, which is in turn coupled to local data transfer antenna 63. A conventional GPS (Global Positioning System) engine 64 is interfaced between input/output switch 61 and junction box 60 and is coupled to local processor 22. As seen in FIG. 2, local data transfer antenna 63 is attached to boom 42 for maximum reception, and it can be located on vehicle 30 elsewhere, if desired.

Positioning system 25 generates position data/information of vehicle 30. In this particular embodiment positioning system 25 consists of a positioning antenna 66 coupled to GPS engine 64 via junction box 60, which communicates with a satellite-based communications network 67 generating position information, including longitude and latitude and bearing data points, of vehicle 30. Positioning antenna 66, GPS engine 64, and communications network 67 is exemplary of a satellite-based Global Positioning System. The instant embodiment of positioning system 25 is preferred insofar as it is readily available, simple, and relatively inexpensive. It is to be understood that any suitable positioning system for generating position information of vehicle 30, including longitude and latitude and bearing data points, can be used without departing from the invention. Positioning information generated by positioning system 25 is sent to local processor 22 for storage in local storage 23 from GPS engine 64. Positioning antenna 66 is mounted to vehicle 30 at any suitable location.

Figure 3:
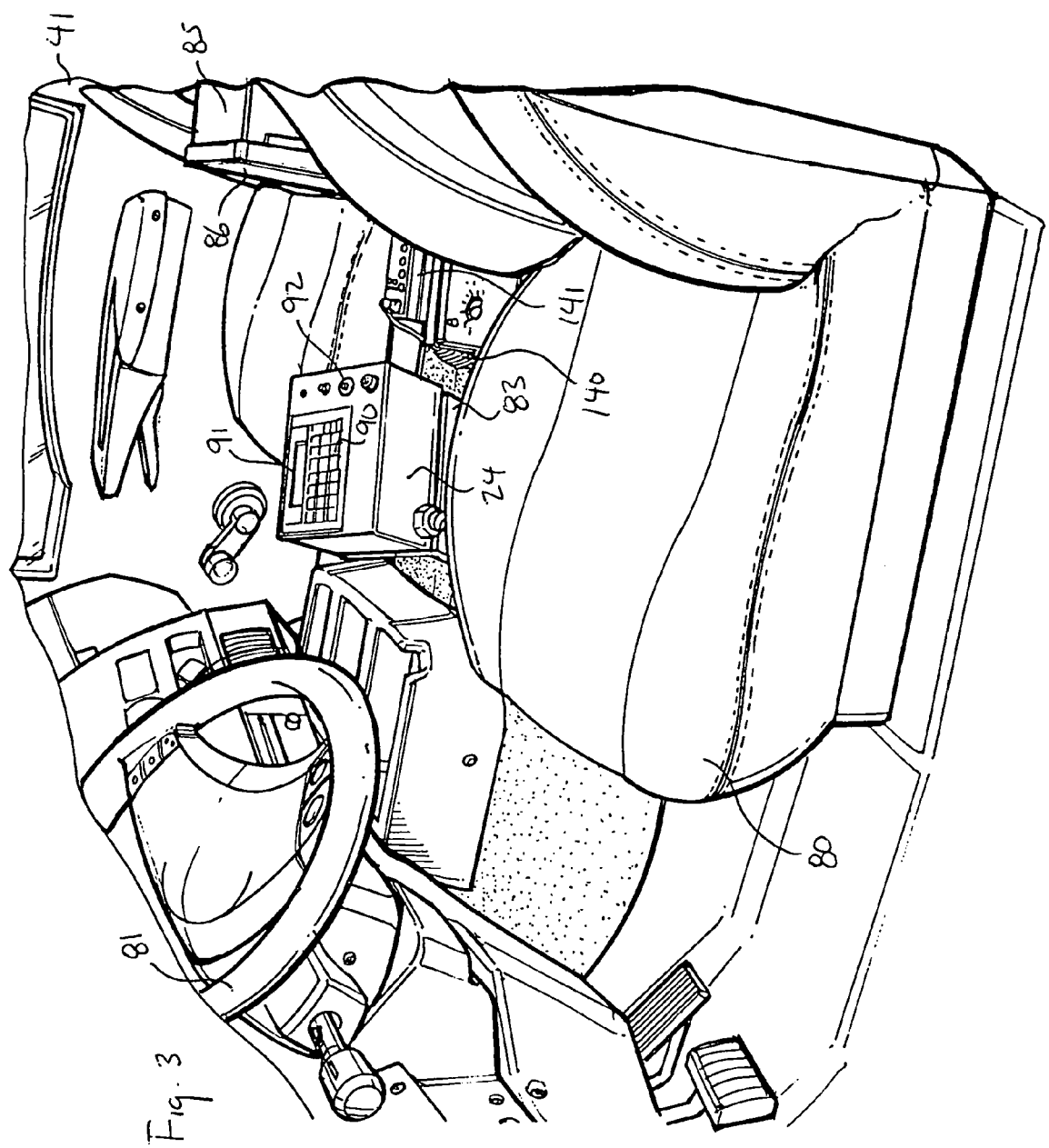
FIG. 3 is a perspective view of an interior of a cab of the vehicle of FIG. 2 illustrating therein an operator input console of the apparatus of FIG. 1.
Figure 4:
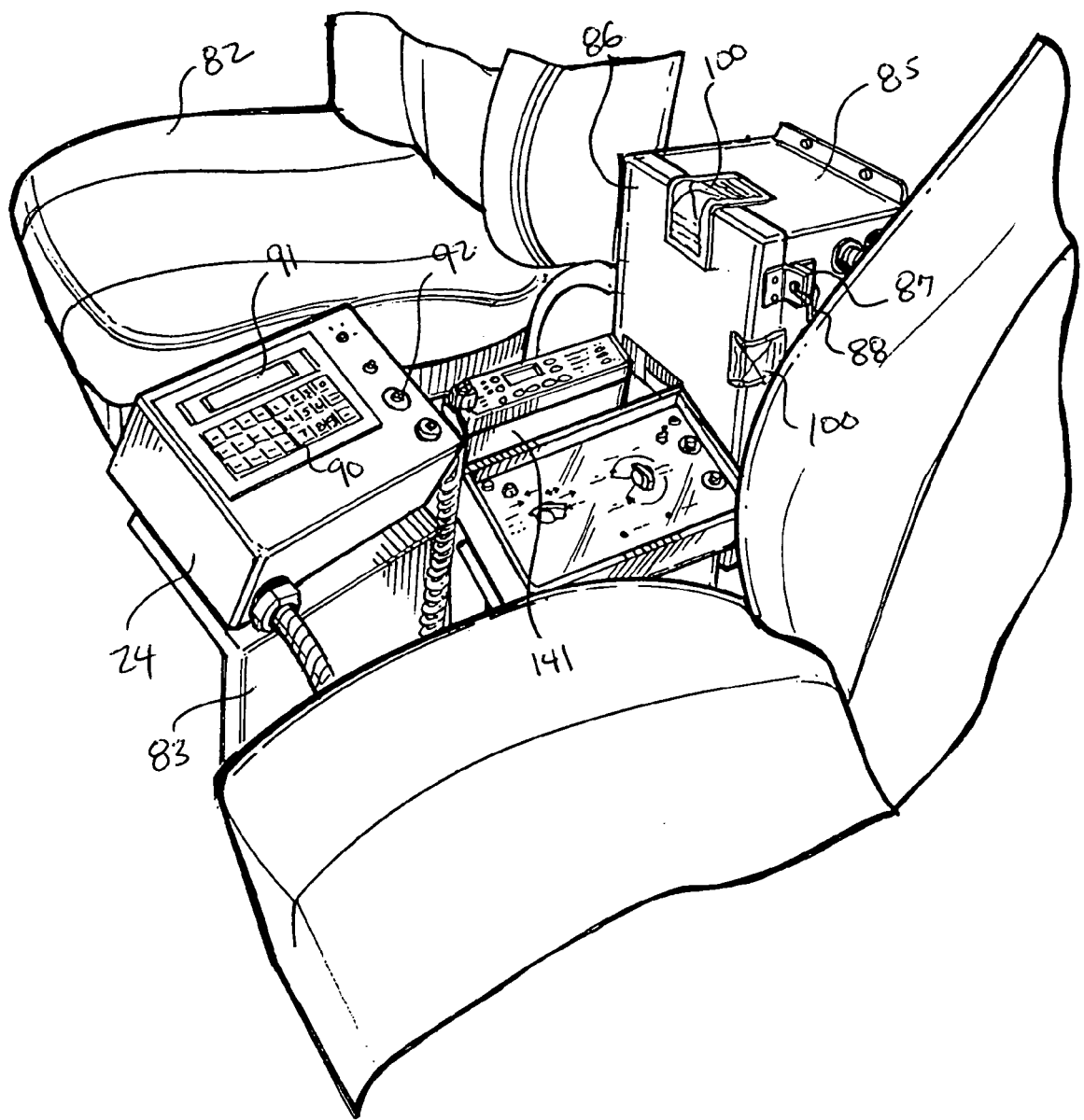
FIG. 4 is a perspective view much like that of FIG. 3 illustrating the operator input console and a safe of the apparatus of FIG. 1.

Looking to FIGS. 3 and 4, illustrated is the interior of cab 41, which is furnished with an operator seat 80 opposing a steering wheel 81 of vehicle 30, and an opposing passenger seat 82. Located in cab 41 between operator seat 80 and passenger seat 82 is mounted input console 24 and, as best seen in FIG. 4, a strongbox or safe 85. Operator input console 24 is affixed to a support 83 mounted in cab 41, and is positioned at an elevated location between operator seat 80 and passenger seat 82 so that it may be easily and readily accessed by an operator sitting in operator seat 80 for inputting operator input information, such as the designation of the manhole through which a collection line is to be accessed, namely, manhole numbers, the operation(s) performed at the designated manhole, work order numbers, customer numbers, the chemical(s) used for a cleaning operation, the physical status of the manhole and/or the physical status of the manhole cover of the manhole through which the collection line is to be accessed, the name of the operator, and any other specific data or information as determined by the operator, etc.

Operator input console 24 is strictly an input unit, which, as seen in FIG. 5, incorporates an input device 90 and a display 91. Input device 90 is a keypad, which is used by the operator of vehicle 30 to enter/input selected information. Keypad is a preferred input device insofar as it is simple to construct, durable, inexpensive, and easy to use. It is to be understood that any suitable input device may be incorporated with input console 24 for allowing the input of information without departing from the invention, including, for instance, a voice recognition input system, a touch screen input device, a mouse or pointing device, etc. Display 91 is a conventional visual display, such as a liquid crystal display or other suitable visual display, which displays relevant information to the operator concerning information input into operator input console 24, status information concerning the operation of vehicle 30 and/or its onboard equipment, etc. Operator input information input into operator input console 24 is sent directly to local processor 22 for storage in local storage 23. Operator input console 24 is fashioned with an ON/OFF switch 92, that is used to turn the components of apparatus 20 onboard vehicle 300N and OFF as desired. Switch 92 is a conventional key-operated switch ON/OFF switch, and can be located elsewhere, if desired. Any suitable ON/OFF switch form can be used without departing from the invention. Operator input console 24 also incorporates a power indicator light 93, which illuminates when apparatus 20 onboard vehicle 30 is ON and which is not illuminated when apparatus 20 onboard vehicle 30 is OFF, a circuit breaker 94 for protecting apparatus 20 onboard vehicle 30 from damaging power surges and power irregularities, and a reset switch 95. When activated, reset switch 95 resets the sensors onboard vehicle 30 to baseline or zero values, but does not change any data taken by the sensors and stored into local storage 23.

Referring back to FIG. 1, local processor 22, local storage 23, input/output switch 61, data transfer radio 62, and GPS engine 64 are each housed in safe 85. Safe 85 is fashioned from steel, titanium, heavy gauge aluminum, a combination thereof, or other similarly extremely strong material or combination of materials, which prevents unauthorized access to the components housed therein and thus prevents tampering and/or manipulation of the components housed therein and the information maintained by local storage 23, whether by the operator of vehicle 30 or another unauthorized party. Safe 85 is fashioned with a door 86, which is opened in order to install therein safe 85 local processor 22, local storage 23, input/output switch 61, data transfer radio 62, and GPS engine 64. After these components are installed in safe 85, such as by affixing them in place to the interior of safe 85 with fasteners, glue, straps, or the like, door 86 is shut and locked, such as with a pad-lock, a combination lock, a bracket 87 secured with a strong metal tie 88, etc.

Safe 85 incorporates structure which functions to provide physical evidence of unauthorized access to the interior of safe 85 and to the components of apparatus 20 housed therein by way of an unauthorized opening of door 86. Seals 100 are adhesively affixed to the exterior of safe 85 overlying the plane of where the edge of door 86 meets safe 85. Seals 100 are preferably made of easily tearable material, such as thin paper, tissue, thin metal foil, or the like, and the adhesive used to apply seals 100 in place is extremely aggressive. Due to the combination of the easily tearable material used to construct seals 100, and the extremely aggressive adhesive used to apply seals 100 in place, it is impossible to open door 86, and also to remove seals 100 from safe 85, without tearing and compromising seals 100. Accordingly, torn seals 100 will readily evidence any unauthorized access into safe 85. When seals 100 are torn, it is to be presumed that unauthorized access to the interior of safe 85 has been made, and that any information maintained by local storage 23 is inherently unreliable. The present embodiment incorporates two seals 100, but less or more can be used. In an alternate embodiment, safe 85 may be fashioned with a tearable gasket between the edges of safe 85 that mate with door 86, which is designed to tear apart in response to opening of door 86. Consistent with the teachings set forth herein, other ways of providing evidence of an unauthorized opening of door 86 can be used without departing from the invention, such as one or more bladders filled with permanent ink or dye which are designed to break in response to an opening of door 86, one or more frangible couplings associated with door 86 which are designed to break in response to an opening of door 86, etc.

Referring back to FIG. 1, as previously mentioned apparatus 20 incorporates sensors 21. Included among sensors are sensors 21A-21D, each of which will now be discussed. Sensors 21A and 21D are each associated with conduit 45, sensor 21B is associated with vacuum hose 43, and sensor 21C is associated with spool 36. Sensors 21A, 21C, and 21D each monitor and generate result data or information of the result of the operation of hose 37, and sensor 21B generates result data or information of the result of the operation of vacuum hose 43.

Turning to FIG. 6, a fragmented side elevational view of vehicle 30 is shown, illustrating storage tank 40, tank 44, a portion of conduit 45, and sensor 21A. Sensor 21A is a conventional, well-known, and readily available flow sensor, which is incorporated with conduit 45 in a conventional and well-known manner allowing it to monitor and determine the amount or volume of fluid pumped therethrough from tank 44 to hose 37 (shown only in FIG. 2). The information collected by sensor 21A indicating the volume of fluid passing through conduit 45 from tank 44 to hose 37, which is a result of the operation of hose 37, is sent by sensor 21A to local processor 22 (FIG. 1), which stores the information in local storage 23 (FIG. 1) in accordance with its operating protocol established by preprogrammed operating instructions of the embedded operating system. Sensor 21A can be located at any position along the length of conduit 45 for allowing it to be able to monitor and determine the amount or volume of fluid pumped therethrough from tank 44 to hose 37, namely, a result of the operation of hose 37. Although sensor 21A is associated with conduit 45, and can be similarly associated with hose 37, if desired, and, moreover, at any location along the fluid flow path as defined by conduit 45 and hose 37 from tank 44 to working end 37A of hose 37.

Like sensor 21A, sensor 21D is also associated with conduit 45. Considering FIG. 1, sensor 21D is a conventional, well-known, and readily available pressure sensor, which is incorporated with conduit 45 at spool 36 in a conventional and well-known manner allowing it to monitor and determine the pressure of fluid pumped therethrough from tank 44 to hose 37 (shown only in FIG. 2). The information collected by sensor 21D indicating the pressure of fluid passing through conduit 45 from tank 44 to hose 37, which is a result of the operation of hose 37, is sent by sensor 21D to local processor 22 (FIG. 1), which stores the information in local storage 23 (FIG. 1) in accordance with the operating protocol of local processor 22 established by its preprogrammed operating instructions of the embedded operating system. Sensor 21D can be located at any position along the length of conduit 45 for allowing it to be able to monitor and determine the pressure of fluid pumped therethrough from tank 44 to hose 37, namely, a result of the operation of hose 37. Although sensor 21D is associated with conduit 45, and can be similarly associated with hose 37, if desired, and, moreover, at any location along the fluid flow path as defined by conduit 45 and hose 37 from tank 44 to working end 37A of hose 37.

With continuing reference to FIG. 1, it is to be understood that sensor 21B is identical to sensor 21A. Like sensor 21A, sensor 21B is a conventional, well-known, off-the-shelf flow sensor, which is incorporated with vacuum hose 43 in a conventional manner allowing it to monitor the amount or volume of fluid/material vacuumed therethrough and into storage tank 40. The information collected by sensor 21B indicating the amount or volume of fluid/material passing through vacuum hose 43 from working end 43A to storage tank 40, which is a result of the operation of vacuum hose 43, is sent by sensor 21B to local processor 22 (FIG. 1), which stores the information in local storage 23 (FIG. 1) in accordance with the operating protocol of local processor 22 established by its preprogrammed operating instructions of the embedded operating system. Sensor 21B can be located at any position along the length of vacuum hose 43 from working end 43A to storage tank 40 for allowing it to be able to monitor and determine the volume or amount of fluid/debris vacuumed therethrough from working end 43A of vacuum hose 43 to storage tank 40, namely, a result of the operation of vacuum hose 43. Like conduit 45, vacuum hose 43 may be furnished with a pressure sensor, like pressure sensor 21D, if desired.

Referring now to FIG. 7 there is illustrated an enlarged fragmented perspective view of vehicle 30 showing sensor 21C and spool 36. Sensor 21C is a conventional, well-known, and readily available counter 102, which is mounted to a bracket 99 supported by motor 38. Sensor 21C can be mounted in place in any suitable or desired way allowing it to interact with spool 36 without departing from the invention as will now be described. Counter 102 has a wheel 101, which engages spool 36 and rotates in response to rotation of spool 36. By the rotation of wheel 101, which occurs in response to rotation of spool 36 due to the interaction of wheel 101 with spool 36, counter 102 is configured to monitor and determine the direction of rotation of spool 36, which is indicative of a result of the operation of hose 37, namely, the winding and unwinding of hose 37 relative to spool 36, and the number times spool 36 rotates in its winding and unwinding directions, which is indicative of the how much hose 37 is unwound and wound, or otherwise moved between its deployed (unwound) and stored (wound) positions. The information collected by sensor 21C indicating the winding and unwinding of hose 37 and how much hose 37 is unwound and wound is sent by sensor 21C to local processor 22 (FIG. 1), which stores the information in local storage 23 (FIG. 1) in accordance with the operating protocol of local processor 22 established by its preprogrammed operating instructions. Sensor 21C can be located at any position for allowing it to interact with spool 36 and monitor and measure as herein described.

Vehicle 30 can incorporate additional sensors for generating result information of the operation of its utility devices, namely, its hose 37 and vacuum hose 37, in addition to any other utility device it may incorporate. For instance, vehicle 30 can, if desired, incorporate a conventional and readily available dump sensor 21E (FIG. 1) associated with an outlet of storage tank 40 for monitoring and measuring the volume or amount of fluid/debris dumped through the outlet of storage tank 40, and for sending this information it collects, which is a result of the operation of the outlet of storage tank 40, to local processor 22 (FIG. 1) for storage thereby in local storage 23 (FIG. 1) in accordance with the operating protocol of local processor 22 established by its preprogrammed operating instructions of the embedded operating system. In this example, the outlet of storage tank 40 is considered a "utility device" of vehicle 30. Another example of sensor that may be incorporated with vehicle 30 is a conventional and readily available load sensor 21F (FIG. 1) associated with boom 42 for monitoring and measuring the load on boom 42, and for sending this information it collects, which is a result of the operation of boom 42 and the load applied to it resulting from its operation, to local processor 22 (FIG. 1) for storage thereby in local storage 23 (FIG. 1). In this example, boom 42 is considered a "utility device." Yet still another example of sensor that may be incorporated with vehicle 30 is a counter, much like counter 102 discussed in conjunction with spool in FIG. 7, associated with boom 42 for monitoring and measuring the lengthening and shortening of boom 42 and thus the maneuvering of boom 42 between its retracted and extended conditions, and for sending this information it collects, which is a result of the operation of boom 42, to local processor 22 (FIG. 1) for storage thereby in local storage 23 (FIG. 1).

In view of the foregoing discussion, one having ordinary skill in the art will readily appreciate that apparatus 20 can incorporate a potentially vast number of sensors suitable for generating information concerning the result of vehicle's 30 utility devices and sending this information to local processor 22 for storage into local storage 23, in accordance with the principle of the invention.

The components of apparatus 20 onboard vehicle 30 operate currently with the operation of vehicle 30, and are typically ON during the operation of vehicle 30, and, moreover, when vehicle 30 is under management by an operator/user and being driven from location to location, and when its utility devices, including its hose 37 and its vacuum hose 43, are put to use for cleaning collection lines. Apparatus 20 onboard vehicle 30 is preferably operable independently of other onboard systems, and is preferably constantly ON during use of vehicle 30 being constantly active taking information from input console 24 and sensors 21 generating and collecting information concerning the result of the operation of its utility devices and also the positioning of vehicle 30 by positioning system 25 during its use, in which the information input into input console 24, the information generated by sensors 21, and the positioning information generated by positioning system 25 is constantly or at predetermined intervals being sent to local processor 22 for storage into local storage 23, as is the date and time information tracked by clock 29.

Clock 29 is coupled to junction box 60, and, according to the invention, tracks date and time information, which is sent by clock 29 to local processor 22 (FIG. 1), which stores the information in local storage 23 (FIG. 1) in accordance with the operating protocol of local processor 22 established by its preprogrammed operating instructions of the embedded operating system. The date and time information generated by clock 29 is collated with the information generated by sensors 21, positioning system 25, and the information provided by input console 24, and local processor 22 stores all of the information sent to it in the form of a report. The formatting and generation of this report by local processor 22 is governed and managed in accordance with the operating protocol of local processor 22 established by its preprogrammed operating instructions. In a preferred embodiment, the report is generated in the form of a spreadsheet, such as an Excel spreadsheet or other suitable spreadsheet format.

Preferably, local processor 22 monitors the date and time tracked by clock 29 and at predetermined intervals, such as every second, every two seconds, every ten seconds, every twenty seconds, every minute, etc., accepts result information/readings from sensors 21 and the positioning information/readings from positioning system 25, and generates and stores into local storage 23 a line item data entry point consisting of the date and time from clock 29, and the result information/readings from sensors 21 and positioning system 25 corresponding to the designated date and time. The input of these line item data entry points is repeated by local processor 22 over and over again, creating a report of many line item data entry points, which together, show the results of the operation of the utility devices of vehicle 30, the positioning of vehicle 30 during the operation of its utility devices, and the date and time thereof, in accordance with the principle of the invention. A timer other than clock 29 can be used by local processor 22 for determining predetermined timed intervals for local processor to initiate a taking and storing of each line item data entry point. Regardless of what the timed intervals consist of, sensors 21 and positioning system 25 preferably operate constantly. Furthermore, any data input into operator input console 24 is automatically stored by local processor 22 into local storage 23, and is made part of the report. It is to be understood that the report stored in local storage 23 is in the form of an electronic file, or perhaps a plurality of electronic files.

Power switch 92 can, if desired, be used by the operator of the vehicle for turning apparatus 20 components onboard vehicle 300N and OFF as desired. If desired, apparatus 20 can be activated by local processor 22 in response to activation of at least one of its sensors 21.

As previously intimated, local processor 22 is managed by an embedded and conventional software operating system, such as a Windows® operating system or other suitable operating system, which governs the operation of local processor 22 and its management of the information it receives and stores from sensors 21, positioning system 25, and clock 29, and also from operator input console 24. Preferably, the operating system utilizes a spreadsheet program, such as Excel, as the format for storing line item data entry points and the operator input information. An example of a report generated by apparatus 20 is set forth in FIG. 9 and designated generally at 115, which shows a plurality of line item data entry points 116 each showing data and time information 116A, result information 116B, positioning information 116C including latitude and longitude information, and operator input information 116D. Report 15 can be configured to incorporate other selected data, including daily totals from the sensors, and any other selected data suitable for providing useful information regarding the operation of vehicle's 30 utility devices. As can be seen in FIG. 9, data entry points 116 are taken at one-minute intervals, and this is set forth as a matter of example, with the understanding that the line item data entry points 116 can be taken and stored by local processor 22 at other designated timed intervals. Again, the communication pathways between local processor 22 and sensors 21, positioning system 25, input console 24 and clock 29 are made by way of conventional cabling/wiring and are conventional communication pathways. If desired, conventional wireless data transfer interconnections may be utilized.

As previously mentioned, apparatus 20 incorporates features that are not onboard vehicle 30, namely, a central client characterized by central processor 26 and central storage 27 associated therewith, which are each housed at a central location remote from vehicle 30, such as a central operating station or the like. Central processor 26 and storage 27 are exemplary of a conventional computer, and an embedded operating system maintained by storage 27 or elsewhere governs the management and operation of central processor 22. Preferably, the operating system for central processor 26 is the same as or compatible with the operating system in conjunction with local processor 22. Preferably, therefore, the operating system for central processor is preferably a conventional software operating system, such as a Windows® operating system or other suitable operating system.

Storage 27 is conventional in nature, consisting of a hard drive storage/memory, flash storage/memory, or other selected storage/memory form. Data transfer link 28 is established and used to transfer the information housed in local storage 23, including the result information, the positioning information, the operator input information, and the date and time information, from the local client to the central client and, more particularly, from local processor 22 and local storage 23 to central processor 26 and central storage 27. Data transfer link 28 is, as previously intimated, established between local processor 22 and central processor 26 by local data transfer radio 62 and antenna 63 carried by vehicle 30, and central data transfer radio 110 and central data transfer antenna 111 maintained at the central location at which the central client is maintained.

In particular, central processor 26 is coupled to central data transfer radio 110, which is in turn coupled to a central data transfer antenna 111. A 110-volt power supply 112 and a power converter 113 are also interfaced between central data transfer radio and central processor 26 as a matter of convention. Central processor 26, central data transfer radio 110, central data transfer antenna 111, power supply 112, and power converter 113 are coupled together with conventional electrical and data transfer cabling/interconnections, and wireless interconnections may be used, if desired.

Local and central data transfer radios 62 and 110, and the corresponding local and central data transfer antennas 63 and 111, are conventional in nature, and well known as a suitable and reliable mechanism for the wireless transfer of data and information, the specific details of which will not be discussed as they are known in the art. Local data transfer radio 62 is housed in safe 85 (FIG. 4) prevents unauthorized access to it, thus maintaining the integrity of any information sent from it to central data transfer radio as long as no unauthorized access into safe 85 is made, according to the principle of the invention. Data transfer link 28, which is used to transfer information between the local client carried by vehicle 30 and the remote central client, is preferably established when apparatus 20, including the components at vehicle 30 and the components at central client, are ON and are in such proximity such that the data transfer radios 62 and 110 are able to "see" each other via antennas 63 and 110. Furthermore, the data transfer between the local client at vehicle and the central client at the central location can be made automatically, such as when the local and central clients "see" each other, when the local and central clients come within a specified range of each other, and also by way of a manual data transfer command initiated at the local client at input console 24, or at the central client.

In a data transfer event between the local client at vehicle 30 and the central client at the central location, local processor 22, in accordance with the operating protocol of local processor 22 established by its preprogrammed operating instructions of the embedded operating system, accesses local storage 23, accesses the information contained therein, namely, the position information, the result information, the operator input information, and the date and time information, and transmits this information, preferably in the form of report 115, to local data transfer radio 62, which sends the information via local data transfer antenna 63 to data transfer link 28, which information is received by central data transfer antenna 111 from data transfer link 28. From central data transfer antenna 111, the information received thereby from data transfer link 28 is sent to central data transfer radio 110 and from there to central processor 26, which, in response thereto in accordance with the operating protocol of central processor 26 established by its preprogrammed operating instructions maintained by storage 27 or other associated storage, stores the information into central storage 27 in the form of report 115, in accordance with the principle of the invention. Report 115 is useful in that it provides detailed and reliable information concerning the results of the operation of vehicle's 30 utility devices, the positioning of vehicle 30 and thus its utility devices during operation thereof, the date and time information associated with the operation of vehicle and its utility devices, and the operator input information. Because the result information provides evidence of the actual usage of vehicle's utility devices, verification can be made that results were actually obtained from the use of the utility devices and not just that the utility devices were activated, in accordance with the principle of the invention. Central processor 27 is preferably associated with an internal clock, which synchronizes clock 29 whenever data is transferred from local processor 22 to central processor 27.

Report 115 is in the form of an electronic document maintained by central storage 27, which may be accessed conventionally by way of central processor 26 and displayed on a monitor 120 associated with central processor 26, printed from a printer in the form of a hardcopy, saved or otherwise downloaded or archived to an external storage device, etc. The reliability of the information embodied in report 115 is established by the security of local processor 22, local storage 23 and data transfer radio 62 provided by safe 85, and the inability of the information stored in local storage 23 from being accessible by an operator of vehicle 30, such as by way of input console 24. In a separate and distinct embodiment, apparatus 20 can be constructed without the provision of input console 24, if desired.

Regarding FIG. 1, the local components can incorporate other unique features, if desired, including, for instance, a smoke detector 130, a breath detector 131, and a seat occupancy sensor 132 for passenger seat 82. Smoke detector 130, breath detector 131, and seat occupancy sensor 132 are each conventional and well known, the structure and function of which will not be discussed. Smoke detector 130, breath detector 131, and seat occupancy detector 132 are each located in cab 41, and are coupled to local processor 22 via input/output switch 61 with conventional electrical and data transfer cabling/interconnections.

Smoke detector 130 is located at any suitable location in cab 41 (FIG. 3) of vehicle 30, in which it monitors and determines the presence of smoke in cab 41, such as tobacco smoke. The smoke detection information generated by smoke detector 130 is sent by smoke detector 130 to local processor 22 (FIG. 1), which stores the information in local storage 23 (FIG. 1) in accordance with the operating protocol of local processor 22 established by its preprogrammed operating instructions. The smoke detection information 140 is included in each line item data point 116 of report 115 and is taken by local processor 22 and put forth in each line item data point 116 in the way previously described in conjunction with the other information put forth in each line item data point 116. Clearly, smoke detection information 140 is useful for showing whether smoke was present in cab 41 of vehicle 30 during its operation, which may be indicative of the operator of the vehicle having smoked in cab 41. Smoking in many utility vehicles is often prohibited, either by local ordinances or by the owner of utility vehicles. By incorporating smoke detector 130 into apparatus 20, reliable information concerning the presence and absence of smoke in cab 41 can be established.

Breath detector 131 is located in cab 41 (FIG. 3) of vehicle 30, in which it monitors and determines the presence of alcohol in cab 41, such as from alcohol itself or from alcohol expelled in the gas exhaled by a human occupant of cab 41, such as the operator of vehicle 30. The breath detection information generated by breath detector 131 is sent by breath detector 131 to local processor 22 (FIG. 1), which stores the information in local storage 23 (FIG. 1) in accordance with the operating protocol of local processor 22 established by its preprogrammed operating instructions. The breath detection information 141 is included in each line item data point 116 of report 115 and is taken by local processor 22 and put forth in each line item data point 116 in the way previously described in conjunction with the other information put forth in each line item data point 116.

Clearly, breath detection information 141 is useful for showing whether alcohol was present in cab 41 of vehicle 30 during its operation, which may be indicative of the operator of the vehicle having been under the influence of alcohol while in cab 41. Drinking and driving and operating equipment is not advisable and usually prohibited by law. By incorporating breath detector 131 into apparatus 20, reliable information concerning the presence and absence of alcohol in cab 41 can be established.

In a preferred embodiment, breath detector 131 is incorporated with a hand-held transmitter 140 of a communications radio 141 (FIGS. 3 and 4), each housed in cab 41, used for vehicle 30 operator radio communication with, for instance, personnel at the central location housing the central client and others, such as operators of other vehicles in a fleet of vehicles. Transmitter 140 transmits voice communications in conjunction with communications radio 141 in a conventional manner. The incorporation of breath detector 131 is made in a conventional manner with conventional wiring techniques. Because transmitter 140 is held close to the mouth in use so that it may pick up a user's voice, the proximity of breath detector 131 is made close to the user's mouth during use of transmitter 140, which allows breath detector 131 to readily encounter the breath of the user employing transmitter 140.

Seat occupancy sensor 132 is associated with passenger seat 82. In response to seat 82 receiving thereon an occupant, seat occupancy sensor 132 is responsive and generates seat occupancy information indicating the presence of an occupant 82 in seat 82. The seat occupancy information generated by seat occupancy sensor 132 is sent by seat occupancy sensor 132 to local processor 22 (FIG. 1), which stores the information in local storage 23 (FIG. 1) in accordance with the operating protocol of local processor 22 established by its preprogrammed operating instructions. The seat occupancy information 142 is included in each line item data point 116 of report 115 and is taken by local processor 22 and put forth in each line item data point 116 in the way previously described in conjunction with the other information put forth in each line item data point 116. Clearly, seat occupancy 142 is useful for showing whether passenger seat 82 was occupied, such as by an unauthorized passenger in cab 41. Occupancy of passenger seats of many utility vehicles, such as vehicle 30, is often prohibited, either by local ordinances or by the owner of utility vehicles. By incorporating seat occupancy sensor 132 into apparatus 20, reliable information concerning the occupancy of passenger seat 82 can be established.

Apparatus 20 can also include other features, such as one or more video cameras for capturing video and/or audio data for storage into local storage 23 by local processor 22, one or more microphones for capturing audio data for storage into local storage 23 by local processor 22, etc. Apparatus 20 can be configured to transfer video and/or audio data from the local client to the central client in a conventional manner.

Those having regard for the art will readily appreciate that apparatus 20 is exemplary for monitoring and collecting positioning information of vehicle 30, result information concerning the operation of its utility equipment, operator input information entered into input console 24, and, if desired, smoke detection information, breath detection information, and/or passenger seat occupancy information. The information generated by apparatus 20 is, therefore, instructive of where work with vehicle 30 was performed, when the work with vehicle 30 was performed, and the results of the operations performed by the utility devices/equipment of vehicle 30. All of this collected information is collected and arranged in a report that is collated and highly organized, in accordance with a predetermined operating system/platform and software program, revealing in an efficient an organized manner the results of the operation of utility devices/equipment, positioning information for the operation of the vehicle and its utility devices/equipment, the date and time of the operation of the vehicle and its utility devices/equipment, etc.

As previously mentioned, vehicle 30 is exemplary of a conventional combination machine for use in cleaning collection lines, and is set forth as a matter of illustration to show a particular embodiment of the invention and a particular implementation of apparatus 20 in conjunction with a particular type of vehicle. Other vehicle forms can be used with system, having various forms of utility equipment. As a matter of example, FIG. 8 depicts a vehicle 150 incorporating various utility equipment including a power take off 151 used to run auxiliary equipment, a crane 152, and a spray nozzle 153 associated with a fluid storage tank 154. Vehicle 150 incorporates a sensor 160 for generating result information concerning the operation of power take off 151, sensors 161 for generating result information concerning the operation of crane 152, and a sensor 162 for generating result information concerning the operation of spray nozzle 153. Sensors 160, 161, and 162 are incorporated into a system constructed ad arranged in accordance with the principle of the invention, and the purpose of disclosure of vehicle 150 in FIG. 8 is to show that a system constructed and arranged in accordance with the principle of the invention can be incorporated with any vehicle and with any form of utility equipment or device carried by thereby, consistent with the teachings set forth in this disclosure. Other vehicle types useful in conjunction with the invention include, for instance, street sweepers, refuse collection vehicles, etc.

The invention has been described above with reference to a preferred embodiment. However, those skilled in the art will recognize that changes and modifications may be made to the embodiment without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. Apparatus comprising:
 a vehicle having a safe and a utility device operable for performing a task having a result capable of being measured, the result of the task performed by the utility device unrelated to a function or operation of the vehicle;
 a local processor associated with local storage each housed in the safe, the safe preventing access to the local processor and the local storage housed therein;
 an operator input console carried by the vehicle for accepting operator input information about the operation of the utility device, the operator input console associated with the local processor and disposed outside of the safe so as to be accessible by an operator of the vehicle;
 a positioning system, associated with the local processor, for generating position information of the vehicle during operation of the utility device;

a sensor, associated with the utility device and the local processor, for generating result information of the result of the task performed by the operation of the utility device;

the local processor for storing in the local storage the position information, the result information, and the operator input information; and the operator input console and the local processor adapted and arranged preventing access to the local storage in response to operation of the operator input console.

2. Apparatus according to claim 1, further comprising:

the vehicle supporting a cab;

a smoke detector, associated with the local processor, for generating smoke detection information from within the cab of the vehicle; and the local processor for storing in the local storage the smoke detection information.

3. Apparatus according to claim 1, further comprising:

a breath detector, associated with the local processor, for generating breath detection information from within the cab of the vehicle; and the local processor for storing in the local storage the breath detection information.

4. Apparatus according to claim 1, wherein the breath detector is associated with an in-cab hand-held transmitter of a communications radio onboard the vehicle.

5. Apparatus according to claim 4, further comprising:

the cab furnished with a passenger seat;

a seat occupancy sensor, associated with the passenger seat, for generating passenger seat occupancy information of the passenger seat; and the local processor for storing in the local storage the passenger seat occupancy information.

6. Apparatus according to claim 5, further comprising:

a central processor associated with central storage each housed at a central location remote from the vehicle;

a wireless data transfer link between the local processor and the central processor;

the local processor for accessing the storage and transmitting the position information, the result information, the operator input information, the smoke detection information, the breath detection information, and the passenger seat occupancy information to the central processor via the wireless data transfer link; and the central processor for receiving and storing into the central storage the position information, the result information, the operator input information, the smoke detection information, the breath detection information, and the passenger seat occupancy information.

7. Apparatus according to claim 6, wherein the wireless data transfer link is provided by a local data transfer radio associated with a local data transfer antenna each carried by the vehicle, and a corresponding central data transfer radio associated with a central data transfer antenna each housed at the central location. information, and the passenger seat occupancy information.

8. Apparatus according to claim 7, wherein the local data transfer radio is housed in the safe.

9. Apparatus according to claim 1, wherein the positioning system is a global positioning system.

10. Apparatus according to claim 1, further comprising at least one engine carried by the vehicle for providing the vehicle with mobility, wherein the utility device is neither at least one of the engine, and at least one part of the engine.

11. Apparatus comprising:

a vehicle having a safe and a utility device operable for performing a task having a result capable of being measured, the result of the task performed by the utility device unrelated to a function or operation of the vehicle;

a local processor associated with local storage each housed in the safe, the safe preventing access to the local processor and the local storage housed therein;

an operator input console carried by the vehicle for accepting operator input information about the operation of the utility device, the operator input console associated with the local processor and disposed outside of the safe so as to be accessible by an operator of the vehicle;

a positioning system, associated with the local processor, for generating position information of the vehicle during operation of the utility device;

a sensor, associated with the utility device and the local processor, for generating result information of the result of the task performed by the operation of the utility device;

the local processor for storing in the local storage the position information, the result information, and the operator input information;

the operator input console and the local processor adapted and arranged preventing access to the local storage in response to operation of the operator input console;

a central processor associated with central storage each housed at a central location remote from the vehicle;

a wireless data transfer link between the local processor and the central processor;

the local processor for accessing the storage and transmitting the position information, the result information, and the operator input information to the central processor via the wireless data transfer link; and the central processor for receiving and storing into the central storage the position information, the result information, and the operator input information.

12. Apparatus according to claim 11, further comprising:

the vehicle supporting a cab;

a smoke detector, associated with the local processor, for generating smoke detection information from within the cab of the vehicle;

the local processor for storing in the local storage the smoke detection information;

the local processor for accessing the storage and transmitting the smoke detection information to the central processor via the wireless data transfer link; and the central processor for receiving and storing into the central storage the smoke detection information.

13. Apparatus according to claim 11, further comprising:

a breath detector, associated with the local processor, for generating breath detection information from within the cab of the vehicle;

the local processor for storing in the local storage the breath detection information;

the local processor for accessing the storage and transmitting the breath detection information to the central processor via the wireless data transfer link; and the central processor for receiving and storing into the central storage the breath detection information.

14. Apparatus according to claim 13, wherein the breath detector is associated with an incab handheld transmitter of a communications radio onboard the vehicle.

15. Apparatus according to claim 11, further comprising:

the cab furnished with a passenger seat;

a seat occupancy sensor, associated with the passenger seat, for generating passenger seat occupancy information of the passenger seat;

the local processor for storing in the local storage the passenger seat occupancy information;

the local processor for storing in the local storage the passenger seat occupancy information;

the local processor for accessing the storage and transmitting the passenger seat occupancy information to the central processor via the wireless data transfer link; and the central processor for receiving and storing into the central storage the passenger seat occupancy information.

16. Apparatus according to claim 11, wherein the positioning system is a global positioning system.

17. Apparatus according to claim 11, further comprising at least one engine carried by the vehicle for providing the vehicle with mobility, wherein the utility device is neither at least one of the engine, and at least one part of the engine.

18. Apparatus according to claim 11, wherein the wireless data transfer link is provided by a local data transfer radio associated with a local data transfer antenna each carried by the vehicle, and a corresponding central data transfer radio associated with a central data transfer antenna each housed at the central location.

19. Apparatus according to claim 18, wherein the local data transfer radio is housed in the safe.

* * * * *